(12) United States Patent
Liu et al.

(10) Patent No.: US 11,991,103 B2
(45) Date of Patent: May 21, 2024

(54) METHOD AND APPARATUS FOR PHASE TRACKING

(71) Applicant: LENOVO (BEIJING) LIMITED, Beijing (CN)

(72) Inventors: Bingchao Liu, Beijing (CN); Chenxi Zhu, Beijing (CN); Hongmei Liu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 833 days.

(21) Appl. No.: 17/274,738

(22) PCT Filed: Apr. 3, 2018

(86) PCT No.: PCT/CN2018/081755
§ 371 (c)(1),
(2) Date: Mar. 9, 2021

(87) PCT Pub. No.: WO2019/191903
PCT Pub. Date: Oct. 10, 2019

(65) Prior Publication Data
US 2022/0052807 A1    Feb. 17, 2022

(51) Int. Cl.
*H04L 5/00* (2006.01)
*H04B 7/0417* (2017.01)

(52) U.S. Cl.
CPC .......... *H04L 5/0048* (2013.01); *H04B 7/0417* (2013.01)

(58) Field of Classification Search
None
See application file for complete search history.

(56) References Cited

U.S. PATENT DOCUMENTS

| 2018/0091350 A1 | 3/2018 | Akkarakaran et al. |
| 2019/0149299 A1* | 5/2019 | Lee ........................ H04L 5/0092 370/329 |
| 2020/0083939 A1* | 3/2020 | Park ...................... H04L 5/0051 |
| 2021/0359733 A1* | 11/2021 | Harrison ............. H04B 7/0639 |

FOREIGN PATENT DOCUMENTS

| CN | 106664278 A | 5/2017 |
| EP | 3755074 A1 | 12/2020 |
| WO | 2018027222 A1 | 2/2018 |

(Continued)

OTHER PUBLICATIONS

Vivo, Remaining Issues on Non-codebook based UL Transmission, R1-1719765, 3GPP TSG RAN WG1 Meeting #91, Nov. 27-Dec. 1, 2017, pp. 1-5, Reno, US.

(Continued)

*Primary Examiner* — Eunsook Choi
(74) *Attorney, Agent, or Firm* — Kunzler Bean & Adamson (57) ABSTRACT

The present disclosure relates to methods and apparatuses. According to some embodiments of the disclosure, a method comprises: transmitting coherent information of a communication device; and receiving configuration information for the communication device, wherein the configuration information indicates a plurality of phase tracking reference signal (PTRS) ports assigned to the communication device and is based at least on the coherent information.

18 Claims, 7 Drawing Sheets

(56) References Cited

FOREIGN PATENT DOCUMENTS

WO  2019112374 A1  6/2019
WO  2019173976 A1  9/2019

OTHER PUBLICATIONS

Nokia, Nokia Shanghai Bell, Combined TPs on UL non-codebook based transmission, R1-1801179, 3GPP TSG RAN WG1 Meeting AH1801, Jan. 22-26, 2018, pp. 1-3, Vancouver, Canada.
Lenovo, Motorola Mobility, Remaining Issues on Codebook Based Transmission for UL, R1-1801823, 3GPP TSG RAN WG1 #92, Feb. 26-Mar. 3, 2018, pp. 1-3, Athens, Greece.
Samsung, Issues on PTRS, R1-1801970, 3GPP TSG RAN WG1 Meeting #92, Feb. 26-Mar. 2, 2018, pp. 1-6, Athens, Greece.
LG Electronics, Text proposals on UL PT-RS power boosting, R1-1802201, 3GPP TSG RAN WG1 Meeting #92, Feb. 26-Mar. 2, 2018, pp. 1-5, Athens, Greece.
International Searching Authority, "Notification of Transmittal of the International Search Report and the Written Opinion of the International Searching Authority, or the Declaration", PCT/CN2018/081755 dated Apr. 3, 2018, pp. 1-6.

* cited by examiner

METHOD AND APPARATUS FOR PHASE TRACKING

TECHNICAL FIELD

The present disclosure generally relates to wireless communication technology, especially for phase tracking reference signal (PTRS) signaling for uplink (UL) and downlink (DL) transmission.

BACKGROUND

In wireless communication technology, PTRS(s) are used for phase noise estimation and compensation in DL and UL transmission, especially for high frequency band. Generally, one or two PTRS ports may be supported for both DL and UL transmission.

UL transmission of a mobile device (also known as a user equipment (UE)) may contain multiple antennas ports with different coherent transmission capabilities supporting fully-coherent, partially-coherent and non-coherent transmission modes, among the antennas ports. However, for non-coherent and partial-coherent transmissions, two PTRS ports may not be sufficient for phase noise estimation and compensation. For example, non-coherent transmission with 3 or 4-layers requires 3 or 4 PTRS ports. Thus, there is a need for supporting more than two PTRS ports for UL transmission with different coherent transmission capabilities.

SUMMARY OF THE DISCLOSURE

One embodiment of the present disclosure provides a method, comprising: transmitting coherent information of a communication device, wherein the coherent information indicates that the communication device uses a non-coherent transmission, and the number of antenna ports configured at the communication device being N; and receiving configuration information for the communication device, wherein the configuration information is based at least on the coherent information and indicates the number of a plurality of phase tracking reference signal (PTRS) ports assigned to the communication device being N.

Another embodiment of the present disclosure provides a method, comprising: transmitting coherent information of a communication device, wherein the coherent information indicates that the communication device uses a partial-coherent transmission, the number of coherent antenna groups configured at the communication device being M, and the number of antenna ports in each coherent antenna group; and receiving configuration information for the communication device, wherein the configuration information is based at least on the coherent information and indicates a plurality of phase tracking reference signal (PTRS) ports assigned to the communication device.

Yet another embodiment of the present disclosure provides an apparatus, comprising: a transmitting circuitry, wherein the transmitting circuitry transmits coherent information of the apparatus, and wherein the coherent information indicates that the apparatus uses a non-coherent transmission, and the number of antenna ports configured at the apparatus being N; and a receiving circuitry, wherein the receiving circuitry receives configuration information for the apparatus, wherein the configuration information is based at least on the coherent information and indicates the number of a plurality of phase tracking reference signal (PTRS) ports assigned to the apparatus being N.

Yet another embodiment of the present disclosure provides an apparatus, comprising: a transmitting circuitry, wherein the transmitting circuitry transmits coherent information of the apparatus, wherein the coherent information indicates that the apparatus uses a partial-coherent transmission, the number of coherent antenna groups configured at the apparatus being M, and the number of antenna ports in each coherent antenna group; and a receiving circuitry, wherein the receiving circuitry receives configuration information for the apparatus, wherein the configuration information is based at least on the coherent information and indicates a plurality of phase tracking reference signal (PTRS) ports assigned to the apparatus.

Yet another embodiment of the present disclosure provides a non-transitory computer-readable medium having stored thereon computer-executable instructions to cause a processor to implement the above method.

Yet another embodiment of the present disclosure provides a method, comprising: receiving coherent information of a communication device, wherein the coherent information indicates that the communication device uses a non-coherent transmission, and the number of antenna ports configured at the communication device being N; determining a plurality of phase tracking reference signal (PTRS) ports for the communication device based at least on the coherent information; and transmitting configuration information to the communication device indicating the number of the PTRS ports assigned to the communication device being N.

Yet another embodiment of the present disclosure provides a method, comprising: receiving coherent information of a communication device, wherein the coherent information indicates that the communication device uses a partial-coherent transmission, the number of coherent antenna groups configured at the communication device being M, and the number of antenna ports in each coherent antenna group; determining a plurality of phase tracking reference signal (PTRS) ports for the communication device based at least on the coherent information; and transmitting configuration information to the communication device indicating the PTRS ports.

Yet another embodiment of the present disclosure provides an apparatus, comprising: a receiving circuitry, wherein the receiving circuitry receives coherent information of a communication device, and wherein the coherent information indicates that the communication device uses a non-coherent transmission, and the number of antenna ports configured at the communication device being N; a processor coupled to the receiving circuitry, wherein the processor determines a plurality of phase tracking reference signal (PTRS) ports for the communication device based at least on the coherent information; and a transmitting circuitry coupled to the processor, wherein the transmitting circuitry transmits configuration information to the communication device indicating the number of the PTRS ports assigned to the communication device being N.

Yet another embodiment of the present disclosure provides an apparatus, comprising: a receiving circuitry, wherein the receiving circuitry receives coherent information of a communication device, wherein the coherent information indicates that the communication device uses a partial-coherent transmission, the number of coherent antenna groups configured at the communication device being M, and the number of antenna ports in each coherent antenna group; a processor coupled to the receiving circuitry, wherein the processor determines a plurality of phase tracking reference signal (PTRS) ports for the communication device based at least on the coherent information; and a transmitting circuitry coupled to the processor, wherein the transmitting circuitry transmits configuration information to the communication device indicating the PTRS ports.

Yet another embodiment of the present disclosure provides a non-transitory computer-readable medium having stored thereon computer-executable instructions to cause a processor to implement the above method.

BRIEF DESCRIPTION OF THE DRAWINGS

In order to describe the manner in which advantages and features of the disclosure can be obtained, a description of the disclosure is rendered by reference to specific embodiments thereof, which are illustrated in the appended drawings. These drawings depict only example embodiments of the disclosure and are not therefore to be considered to be limiting of its scope.

DETAILED DESCRIPTION

The detailed description of the appended drawings is intended as a description of the currently preferred embodiments of the present disclosure, and is not intended to represent the only form in which the present disclosure may be practiced. It should be understood that the same or equivalent functions may be accomplished by different embodiments that are intended to be encompassed within the spirit and scope of the present disclosure.

Figure 1:
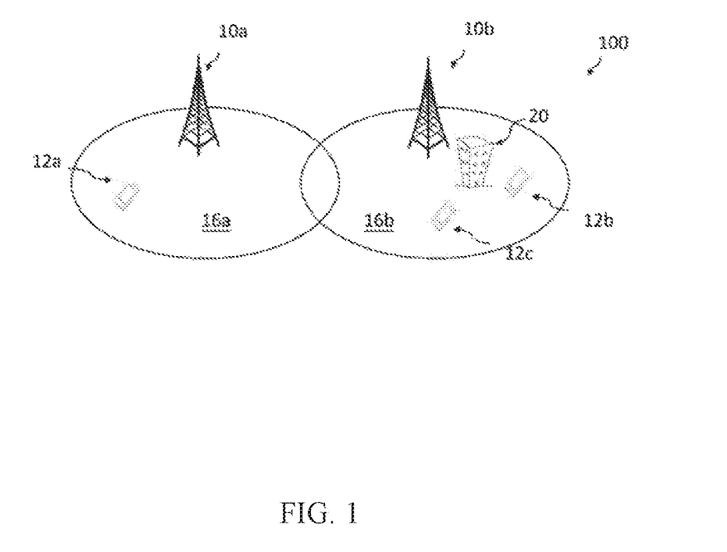
FIG. 1 illustrates a schematic wireless communication system according to an embodiment of the present disclosure.

FIG. 1 illustrates a wireless communication system 100 according to an embodiment of the disclosure.

As shown in FIG. 1, the wireless communication system 100 includes a plurality of base stations 10 including base stations 10a and 10b, and a plurality of UEs 12, including UEs 12a, 12b and 12c. The plurality of base stations 10 may be based, for example, on the standards of long-term evolution (LTE), LTE-Advanced (LTE-A), new radio (NR), or other suitable standards. For example, the plurality of base stations 10 may be a plurality of eNBs, or a plurality of gNBs. Each base station 10 may define one or more cells 16, such as cell 16a or 16b, and each cell 16 may support mobility management through the radio resource control (RRC) signaling. A group of cells 16 may form a radio access network-based (RAN-based) notification area (RNA). The UE 12 may be a computing device, a wearable device, and a mobile device, etc. The UEs with reference numerals 12a, 12b and 12c may represent the same UE moving in different locations within the coverage of the cell 16a or 16b, or different UEs. Persons skilled in the art should understand that as the 3GPP (3rd Generation Partnership Project) and the communication technology develop, the terminologies recited in the specification may change, which should not affect the principle of the disclosure.

Figure 2:
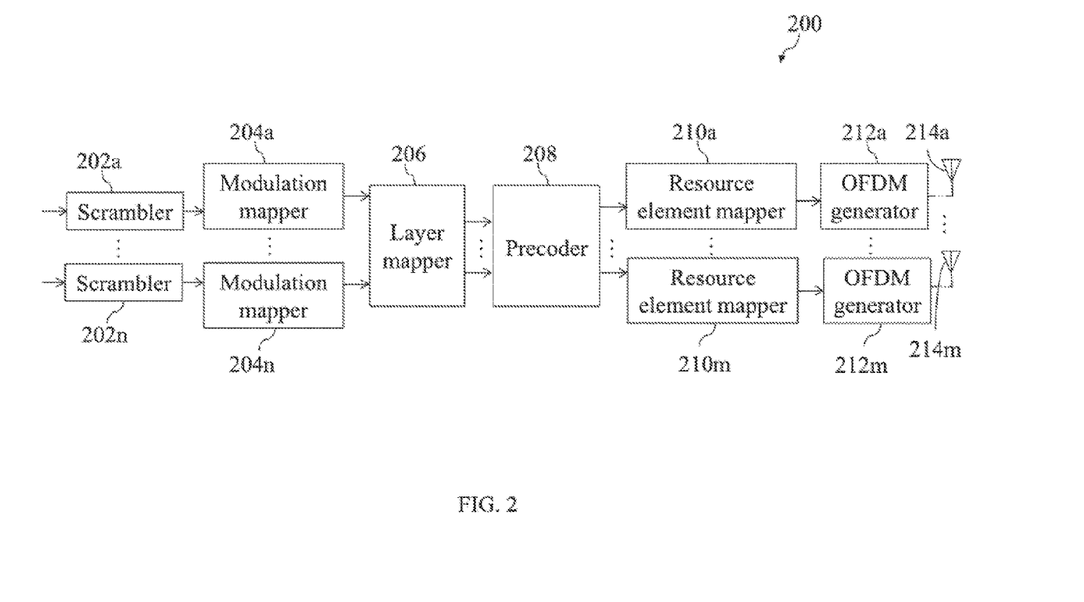
FIG. 2 illustrates a schematic transmitting circuitry having multiple antennas according to an embodiment of the present disclosure.

FIG. 2 illustrates a transmitting circuitry 200 of a UE according to an embodiment of the disclosure.

As shown in FIG. 2, the transmitting circuitry 200 comprises one or more modulation chains, each comprising a scrambler 202 (e.g., a scrambler 202a, . . . or a scrambler 202n) and a modulation mapper 204 (e.g., a modulation mapper 204a, . . . or a modulation mapper 204n). Codewords are scrambled by a respective scrambler 202, and then modulated by a respective modulation mapper 204.

A layer mapper 206 maps the modulated symbol streams produced by modulation mappers 204 (i.e., modulation mappers 204a, . . . and 204n) onto one or more transmission layers. The actual number of transmission layers (also known as the transmission rank) used by the layer mapper 206 is typically a selectable parameter. The choice of this value may depend, for example, on the channel conditions between the transmitting circuitry 200 and a given receiver (not shown) to which the transmission is intended. The transmission layers may be subsequently transmitted over Multiple-Input Multiple-Output (MIMO) communication channels.

The layers are provided to a precoder 208. Precoder 208 may map the layers onto M transmission channels, corresponding to M transmit (Tx) antenna ports 214 (i.e., antenna ports 214a, . . . and 214m) of the transmitting circuitry, according to a precoding matrix W. Note that a given antenna port may not necessarily correspond to a single physical antenna, but may correspond to a "virtual antenna" whose transmitted signal is generated as a superposition (a weighted sum) of the signals stemming from a number of physical antennas. Note also that the number of antenna ports may be equal to or larger than the number of layers.

In an embodiment, the number of transmission layers used by the layer mapper is three, and the transmitting circuitry comprises four antenna ports. In one example, the precoder maps the three layers onto the four antenna ports according to a precoding matrix W The precoding matrix W may be selected from the precoding matrixes W shown in following Table 1 according to the transmitted precoding matrix indicator (TPMI) index:

TABLE 1

Precoding matrix W for three-layer transmission using four antenna ports

| TPMI index | W (ordered from left to right in increasing order of TPMI index) | | | |
|---|---|---|---|---|
| 0-3 | $\frac{1}{2}\begin{bmatrix} 1 & 0 & 0 \\ 0 & 1 & 0 \\ 0 & 0 & 1 \\ 0 & 0 & 0 \end{bmatrix}$ | $\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 1 & 0 & 0 \\ 0 & 1 & 0 \\ -1 & 0 & 0 \\ 0 & 0 & 1 \end{bmatrix}$ | $\frac{1}{2\sqrt{3}}\begin{bmatrix} 1 & 1 & 1 \\ 1 & -1 & 1 \\ 1 & 1 & -1 \\ 1 & -1 & -1 \end{bmatrix}$ |

TABLE 1-continued

Precoding matrix W for three-layer transmission using four antenna ports

| TPMI index | W (ordered from left to right in increasing order of TPMI index) | | | |
|---|---|---|---|---|
| 4-6 | $\frac{1}{2\sqrt{3}}\begin{bmatrix} 1 & 1 & 1 \\ 1 & -1 & 1 \\ j & j & -j \\ j & -j & -j \end{bmatrix}$ | $\frac{1}{2\sqrt{3}}\begin{bmatrix} 1 & 1 & 1 \\ -1 & 1 & -1 \\ 1 & 1 & -1 \\ -1 & 1 & 1 \end{bmatrix}$ | $\frac{1}{2\sqrt{3}}\begin{bmatrix} 1 & 1 & 1 \\ -1 & 1 & -1 \\ j & j & -j \\ -j & j & j \end{bmatrix}$ | — |

In another embodiment, the number of transmission layers used by the layer mapper is four, and the transmitting circuitry comprises four antenna ports. In one example, the precoder maps the four layers onto the four antenna ports according to a precoding matrix W. The precoding matrix W may be selected from the precoding matrixes W shown in following Table 2 according to the TPMI index:

TABLE 2

Precoding matrix W for four-layer transmission using four antenna ports

| TPMI index | W (ordered from left to right in increasing order of TPMI index) | | | |
|---|---|---|---|---|
| 0-3 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ | $\frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix}$ | $\frac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix}$ | $\frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}$ |
| 4 | $\frac{1}{4}\begin{bmatrix} 1 & 1 & 1 & 1 \\ 1 & -1 & 1 & -1 \\ j & j & -j & -j \\ j & -j & -j & j \end{bmatrix}$ | — | — | — |

Resource element mappers 210 (i.e., mappers 210a, . . . and 210m) allocate resource elements (e.g., time-frequency allocations) to the respective transmission channels. The outputs of the resource element mappers 210 are processed in the present example by respective Orthogonal Frequency Division Multiplexing (OFDM) generators 212 (i.e., generators 212a, . . . and 210m), which produce OFDM signals that are transmitted via antenna ports 214 (i.e., ports 214a, . . . and 214m). Alternatively, the outputs of the resource element mappers 210 may be processed by respective generators employing other multiplexing schemes.

UL transmission of a UE may support multiple antennas ports. Full-coherent transmission can be supported if the antenna ports are all coherent. However, only non-coherent or partial-coherent transmission can be applied when the antenna ports are not coherent. The UEs thus may have different coherent transmission capabilities, such as full-coherent, partial-coherent and non-coherent transmission.

For non-coherent transmission using three or four layers, the number of non-coherent transmission ports may be three or four. Since the phase noises of these ports are independent, three or four PTRS ports are needed to separately estimate the phase noises of these non-coherent transmission ports. However, in the current specifications TS38.211 and TS38.214 specified by 3GPP, only one or two PTRS ports may be supported, wherein sounding reference signal (SRS) ports 0 and 2 share PTRS port 0, and SRS ports 1 and 3 share PTRS port 1. This cannot support three or four layers non-coherent transmission. Partial-coherent transmission may have the similar problem. Thus, there is a need for supporting more than two PTRS ports for codebook based transmission with different coherent transmission capabilities.

Embodiments of the present disclosure propose technical solutions for signaling PTRS, which can at least solve the above technical problems in the new generation communication systems, such as 5G communication systems. For example, three or four PTRS ports assigned for UL codebook-based transmission with non-coherent transmission ports. More details on the embodiments of the present disclosure will be illustrated in the following text in combination with the appended drawings.

Figure 3:
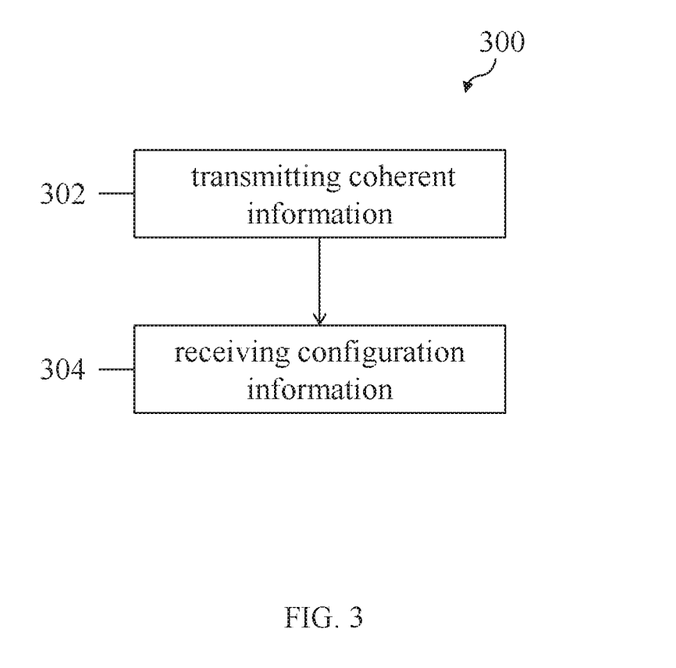
FIG. 3 illustrates a flowchart for a method according to an embodiment of the present disclosure.

FIG. 3 illustrates a method 300 according to an embodiment of the disclosure. In some embodiments, the method 300 is performed by a communication device, such as a UE 12a. In certain embodiments, the method 300 may be performed by a processor executing program code, for example, a microcontroller, a microprocessor, a CPU, a GPU, an auxiliary processing unit, a FPGA, or the like.

As shown in FIG. 3, in step 302, coherent information of the communication device is transmitted. In an embodiment, the coherent information indicates that the communication device uses a full-coherent transmission, a non-coherent transmission, or a partial-coherent transmission. In step 304, configuration information for the communication device is received. In an embodiment, the configuration information indicates a plurality of PTRS ports assigned to the communication device and is based at least on the coherent information.

Take the UL transmission between UE 12a and base station 10a as an example. UE 12a transmits its coherent information to base station 10a; base station 10a then configures a plurality of PTRS ports for UE 12a and transmits the configuration information indicating the configured PTRS ports assigned to UE 12a; and then UE 12a receives the configuration information from base station 10a for the UL transmission.

In an embodiment, coherent information, for example, indicates that the non-coherent transmission is used by UE 12a. The coherent information may further include a number of antenna ports (e.g., N). The configuration information may indicate that the number of the PTRS ports assigned to UE is N, which means that N PTRS ports are configured by base station 10a for UE's UL transmission.

In the current embodiment, upon receipt of the configuration information from base station 10a, UE 12a may transmit PTRS with v PTRS ports selected from the N configured PTRS ports, wherein v denotes the number of transmission layers. As mentioned above, the number of the transmission layers may depend, for example, on the channel conditions. In one embodiment, the number of the transmission layers is determined by base station 10a. Each PTRS port of the v PTRS ports is associated with a transmission layer transmitted with a corresponded SRS port. For example, PTRS port 0 is associated with the layer transmitted with SRS port 0, PTRS port 1 is associated with the layer transmitted with SRS port 1, and PTRS port v-1 is associated with the layer transmitted with SRS port v-1.

For example, when a precoding matrix $W=1/2 \times [1,0,0,0; 0,1,0,0;0,0,1,0;]^T$ (corresponding to the precoding matrix in Table 1 when TPMI index=0) or $W=1/2 \times [1,0,0,0; 0,1,0,0; 0,0,1,0;0,0,0,1]^T$ (corresponding to the precoding matrix in Table 2 when TPMI index=0) is configured for PUSCH transmission, the configuration information may indicate that the number of the PTRS ports is four.

In the former case, PTRS is transmitted on three PTRS ports selected from among the four PTRS ports, with each PTRS port of the three PTRS ports associated with a transmission layer transmitted with a corresponded SRS port. For example, PTRS port 0 is associated with the layer transmitted with SRS port 0, PTRS port 1 is associated with the layer transmitted with SRS port 1, and PTRS port 2 is associated with the layer transmitted with SRS port 2.

In the latter case, PTRS is transmitted on the four PTRS ports, with each PTRS port of the four PTRS ports associated with a transmission layer transmitted with a corresponded SRS port. For example, PTRS port 0 is associated with the layer transmitted with SRS port 0, PTRS port 1 is associated with the layer transmitted with SRS port 1, PTRS port 2 is associated with the layer transmitted with SRS port 2, and PTRS port 3 is associated with the layer transmitted with SRS port 3.

In another embodiment, the coherent information indicates that the partial-coherent transmission is used, and includes the number of coherent antenna port groups (e.g., M) and the number of antenna ports in each coherent antenna port group (CoAntGrop). The antenna ports in each coherent antenna group are coherent with each other. The configuration information may indicate that the number of the PTRS ports configured by base station 10a is M.

In the current embodiment, the method 300 may further comprise transmitting PTRS with k PTRS ports, wherein k={v, M} and v denotes the number of transmission layers. As mentioned above, the number of the transmission layers may depend, for example, on the channel conditions. In one embodiment, the number of the transmission layers is determined by base station 10a. Each PTRS port is associated with a corresponding transmission layer of the transmission layers which are transmitted with SRS ports within a corresponding CoAntGrop. For example, a PTRS port i is associated with a transmission layer $[x_i]$ of transmission layers transmitted with SRS ports within $i^{th}$ coherent antenna group.

According to a preferred embodiment, the configuration information further includes downlink control information (DCI) including a parameter indicating the value of $[x_i]$. The parameter has a bitwidth of $\Sigma_{i=1}^{min\{v,M\}}\lceil \log_2(S_i) \rceil$ that consists of min{v, M} parts, wherein $S_i$ denotes the number of antenna ports in $i^{th}$ coherent antenna group. The value of $[x_i]$ is indicated in the $i^{th}$ part of the parameter.

In yet another embodiment, the coherent information indicates that the full-coherent transmission is used. In an embodiment, the configuration information may indicate that the number of the PTRS ports is one. In the current embodiment, the method 300 may further comprise transmitting PTRS with one PTRS port.

According to a preferred embodiment, the configured PTRS ports form a pattern in time-frequency domain. For example, the PTRS ports may be arranged in the pattern with frequency-division multiplexing manner. Alternatively, the PTRS ports may be arranged in the pattern with frequency-division multiplexing with frequency domain orthogonal cover code (FD-OCC) manner.

In an embodiment, the configuration information may further include the pattern for UL PTRS transmission, including the frequency density and the time density for UL PTRS transmission. The configuration information may also include subcarrier offsets for UL PTRS transmission.

In current specification TS38.331, v15.0.0, specified by 3GPP, UL PTRS configuration is defined as follows:

```
Uplink-PTRS-Config ::=          SEQUENCE {
    cp-OFDM                         SetupRelease { SEQUENCE {
        frequencyDensity                TYPE_FFS!,
        timeDensity                     TYPE_FFS!,
        nrofPorts                       ENUMERATED {n1, n2},
        resourceElementOffset           FFS_Value                           OPTIONAL
    }
    }                                                                       OPTIONAL,
    dft-S-OFDM                      SetupRelease { SEQUENCE {
        sampleDensity                   FFS_Value                           OPTIONAL,
        timeDensity                     ENUMERATED {d1, d2}                 PTIONAL,
        sequence                        FFS_Value                           OPTIONAL
    }
    }                                                                       OPTIONAL,
}
```

In the above configuration, "frequencyDensity" indicates the presence and frequency density of UL PTRS, "timeDensity" indicates the presence and time density of UL PTRS, "nrofPorts" is an indicator related to the number of UL PTRS ports, and "resourceElementOffset" indicates the subcarrier offset for UL PTRS. "frequencyDensity" is a function of scheduled bandwidth, and "timeDensity" is a function of scheduled Modulation and Coding Scheme (MCS).

A resource pattern of each UL PTRS port is a function of the corresponding "scheduled MCS" and "scheduled bandwidth" parameters in a corresponding bandwidth part as shown in the following Table 3 and Table 4:

TABLE 3

Time density of PTRS as a function of scheduled MCS

| Scheduled MCS | Time density ($L_{PT\text{-}RS}$) |
|---|---|
| $I_{MCS}$ < ptrs-$MCS_1$ | PTRS is not present |
| ptrs-$MCS_1$ ≤ $I_{MCS}$ < ptrs-$MCS_2$ | 4 |
| ptrs-$MCS_2$ ≤ $I_{MCS}$ < ptrs-$MCS_3$ | 2 |
| ptrs-$MCS_3$ ≤ $I_{MCS}$ < ptrs-$MCS_4$ | 1 |

TABLE 4

Frequency density of PTRS as a function of scheduled bandwidth

| Scheduled bandwidth | Frequency density ($K_{PT\text{-}RS}$) |
|---|---|
| $N_{RB}$ < $N_{RB0}$ | PTRS is not present |
| $N_{RB0}$ ≤ $N_{RB}$ < $N_{RB1}$ | 2 |

$I_{MCS}$ denotes scheduled MCS and $N_{RB}$ denotes scheduled bandwidth. ptrs-$MCS_i$ (i=1,2,3,4) denotes the time domain threshold and are configured by the higher-layer parameter UL-PTRS-time-density. $N_{RB0}$ and $N_{RB1}$ denote the frequency domain threshold and are configured by the higher-layer parameter UL-PTRS-frequence-density.

According to Tables 3 and 4, UE may assume that PTRS is not present when scheduled MCS is smaller than ptrs-$MCS_1$ or the number of scheduled resource blocks (RBs) is smaller than $N_{RB}$.

If the higher-layer parameter UL-PTRS-time-density indicates that the thresholds ptrs-$MCS_i$=ptrs-$MCS_{i+1}$, then the time density $L_{PT\text{-}RS}$ of the associated row where both these thresholds appear in Table 3 is disabled. If the higher-layer parameter UL-PTRS-frequency-density indicates that the thresholds $N_{RB,i}$=$N_{RB,i+1}$, then the frequency density $K_{PT\text{-}RS}$ of the associated row where both these thresholds appear in Table 4 is disabled.

If either of the parameters PTRS time density ($L_{PT\text{-}RS}$) and PTRS frequency density ($K_{PT\text{-}RS}$), shown in Table 3 and Table 4, are not configured, the UE shall assume $K_{PT\text{-}RS}$=1 and/or $K_{PT\text{-}RS}$=2.

The maximum number of configured PTRS ports is given by the higher-layer parameter UL-PTRS-ports. As mentioned above, in current specifications specified by 3GPP, only one or two PTRS ports may be supported. That is, only one or two PTRS ports may be configured by the higher-layer parameter nrofPorts with n1 or n2. If two PTRS ports are configured, the PTRS ports will be frequency-division multiplexed with different subcarrier offset $k_{ref}^{RE}$ configured by the higher-layer parameter UL-PTRS-RE-offset as described in specification TS38.211, v15.0.0, specified by 3GPP.

As describe above, the present disclosure supports more than two PTRS ports for codebook based transmission with different coherent transmission capabilities. For example, a UE may be configured with the high-layer parameter UL-PTRS-present and with t PTRS ports by the higher-layer parameter nrofPorts with nt. A plurality of multiplexing method can be employed among these PTRS ports.

In an embodiment, the PTRS ports may be arranged in the pattern with frequency-division multiplexing manner. In this embodiment, each PTRS port is configured with a different subcarrier offset. For example, t different higher-layer parameter UL-PTRS-RE-offset will be configured for each PTRS port.

Figure 4:
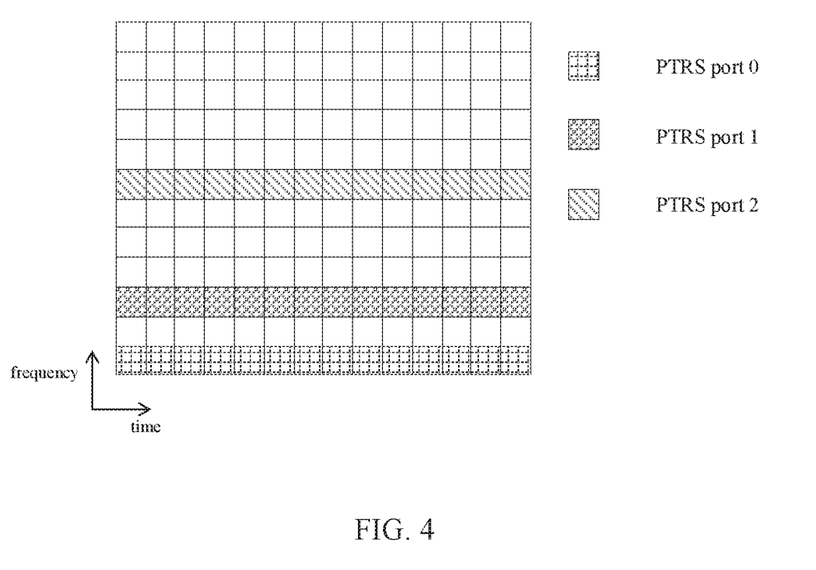
FIG. 4 illustrates an example PTRS port pattern according to an embodiment of the present disclosure.

FIG. 4 illustrates an example PTRS port pattern in a resource block (RB) according to an embodiment of the present disclosure. In this example, a UE is configured with three PTRS ports, i.e., PTRS port 0, PTRS port 1, and PTRS port 2. As shown in the FIG. 4, PTRS ports are configured with three different subcarrier offsets by three different higher-layer parameters UL-PTRS-RE-offset and are configured with a time density equal to one.

In another embodiment, the PTRS ports are arranged in the pattern with FD-OCC manner. In this embodiment, the subcarrier offsets for PTRS ports in different PTRS port pairs are different.

For example, length-2 frequency domain orthogonal cover code (2-FD-OCC) ([+1, +1] and [+1, −1]) across adjacent resource element (RE) in the frequency domain are used for code-multiplexing PTRS port 2p-1 and PTRS port 2p. Different PTRS port pairs are multiplexed in frequency domain with different subcarrier offsets indicated by UL-PTRS-RE-offset.

Figure 5:
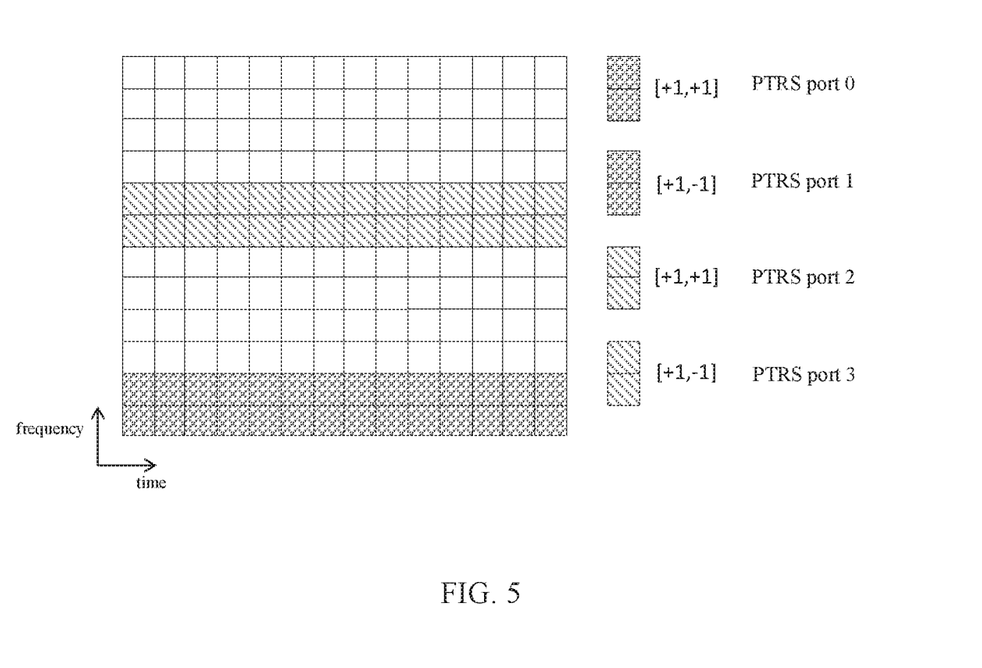
FIG. 5 illustrates an example PTRS port pattern according to an embodiment of the present disclosure.

FIG. 5 illustrates an example PTRS port pattern in a resource block (RB) according to an embodiment of the present disclosure. In this example, a UE is configured with four PTRS ports, i.e., PTRS port 0, PTRS port 1, PTRS port 2, and PTRS port 3. PTRS ports 0 and 1 are multiplexed with different orthogonal cover codes (OCCs). Similarly, PTRS ports 2 and 3 are multiplexed with different OCCs. PTRS port pair 0/1 and pair 2/3 are multiplexed in frequency domain with different subcarrier offsets indicated by UL-PTRS-RE-offset.

Figure 6:
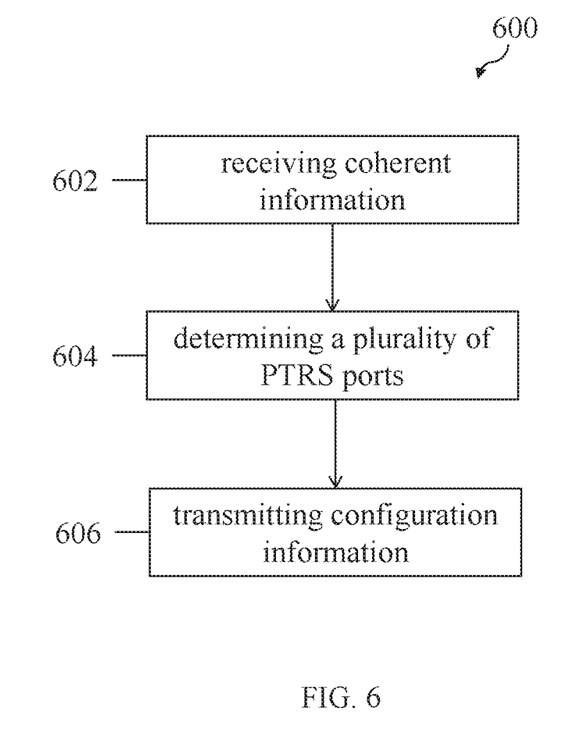
FIG. 6 a flowchart for a method according to an embodiment of the present disclosure.

FIG. 6 illustrates a method 600 according to an embodiment of the disclosure. In some embodiments, the method 600 is performed by an apparatus, such as a base station 10a. In certain embodiments, the method 600 may be performed by a processor executing program code, for example, a microcontroller, a microprocessor, a CPU, a GPU, an auxiliary processing unit, a FPGA, or the like.

As shown in FIG. 6, in step 602, coherent information of a communication device is received. According to an embodiment, the communication device may be one of UE 12a-12c. The coherent information indicates that the communication device uses a full-coherent transmission, a non-coherent transmission, or a partial-coherent transmission.

In step 604, based at least on the coherent information, a plurality of PTRS ports for the communication device is determined. In step 606, configuration information indicating the PTRS ports is transmitted to the communication device.

In an embodiment, the coherent information indicates that the non-coherent transmission is used. The coherent information may further include the number of antenna ports (e.g., N). The number of the PTRS ports for the communication device is thus determined as N. The configuration information indicates the number of the PTRS ports being N. Each PTRS port may be configured to be associated with a layer transmitted with a corresponded SRS port.

In another embodiment, the coherent information indicates that a partial-coherent transmission is used. The coherent information may further include a number of coherent antenna groups (e.g., M) and the number of antenna ports in each coherent antenna group (CoAntGrp). The number of the PTRS ports for the communication device is thus determined as M. The configuration information indicates the number of the PTRS ports being M.

Each PTRS port may be configured to be associated with a corresponding transmission layer of the transmission layers transmitted with SRS ports within a corresponding CoAntGrop. For example, a PTRS port i is associated with a transmission layer $[x_i]$ of transmission layers and is transmitted with sounding reference signal (SRS) ports within $i^{th}$ CoAntGrop.

According to a preferred embodiment, a parameter in the DCI may be configured to indicate the value of $[x_i]$. The parameter has a bitwidth of $\Sigma_{i=1}^{min\{v,M\}}\lceil \log_2(S_i) \rceil$ and $min\{v, M\}$ parts, v denotes the number of transmission layers, $S_i$ denotes the number of antenna ports in $i^{th}$ coherent antenna group, and each part has a bitwidth of $\lceil \log_2(S_i) \rceil$. The value of $[x_i]$ is indicated in the $i^{th}$ part of the parameter. As mentioned above, the number of the transmission layers may depend, for example, on the channel conditions.

In yet another embodiment, the coherent information indicates that the full-coherent transmission is used. The number of the PTRS ports for the communication device is thus determined as one. The configuration information may indicate that the number of the PTRS ports is one.

In an embodiment, the PTRS ports are configured to form a pattern in time-frequency domain. For example, the PTRS ports may be configured in the pattern with frequency-division multiplexing manner. Alternatively, the PTRS ports may be configured in the pattern with frequency-division multiplexing with FD-OCC manner. The implementations of the resource pattern of the PTRS ports can refer to the specific descriptions of FIGS. 3-5 and the foregoing corresponding paragraphs in this specification.

Figure 7:
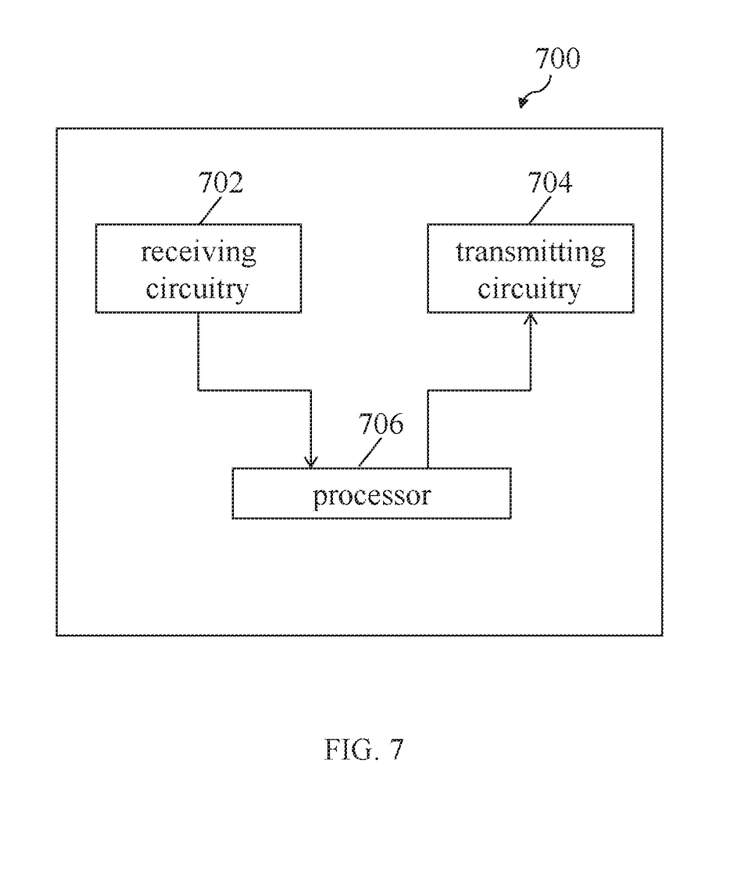
FIG. 7 illustrates an example block diagram of an apparatus according to an embodiment of the present disclosure.

FIG. 7 illustrates a block diagram of an apparatus 700 according to an embodiment of the present disclosure.

As shown in FIG. 7, the apparatus 700 may include a receiving circuitry 702, a transmitting circuitry 704, and a processor 706 coupled to the receiving circuitry and the transmitting circuitry. The apparatus 700 may be a base station or a UE. Although in this figure, elements such as processor, transmitting circuitry, and receiving circuitry are described in the singular, the plural is contemplated unless limitation to the singular is explicitly stated. In some embodiments, the receiving circuitry 702 and the transmitting circuitry 704 are combined into a single device, such as a transceiver. In certain embodiments, the apparatus 700 may further include an input device, a memory, and/or other components.

In some embodiments, the transmitting circuitry 704 may transmit coherent information of the apparatus 700, and the receiving circuitry 702 may receive configuration information for the apparatus 700.

In an embodiment, the coherent information indicates that the apparatus uses a non-coherent transmission, and the number of antenna ports configured at the apparatus being N. The configuration information is based at least on the coherent information and indicates the number of a plurality of PTRS ports assigned to the apparatus being N.

In the current embodiment, the transmitting circuitry 704 may further transmit PTRS with v PTRS ports selected from the N PTRS ports, wherein v denotes the number of transmission layers. The processor 706 may associate each PTRS port with a transmission layer transmitted with a corresponded SRS port.

In another embodiment, the coherent information indicates that the apparatus uses a partial-coherent transmission, the number of coherent antenna groups configured at the apparatus being M, and the number of antenna ports in each coherent antenna group. The configuration information is based at least on the coherent information and indicates a plurality of PTRS ports assigned to the apparatus.

In the current embodiment, the configuration information may further indicate the number of PTRS ports being M. The transmitting circuitry 704 may further transmit PTRS with k PTRS ports, wherein k={v, M} and v denotes the number of transmission layers. The processor 706 may associate a PTRS port i with a transmission layer $[x_i]$ of transmission layers, transmitted with SRS ports within $i^{th}$ coherent antenna group.

According to a preferred embodiment, the receiving circuitry 702 may further receive DCI including a parameter indicating the value of $[x_i]$. The parameter has a bitwidth of $\Sigma_{i=1}^{min\{v,M\}}\lceil \log_2(S_i) \rceil$ comprised of $min\{v, M\}$ parts, wherein $S_i$ denotes the number of antenna ports in $i^{th}$ coherent antenna group. The value of $[x_i]$ is indicated in the $i^{th}$ part of the parameter.

In the above embodiments, the apparatus 700 may be a UE such as a computing device, a wearable device, and a mobile device. The apparatus 700 can communicate with a base station.

In other embodiments, the receiving circuitry 702 may receive coherent information of a communication device. According to an embodiment, the communication device may be one of UE 12a-12c.

In an embodiment, the coherent information indicates that the communication device uses a non-coherent transmission, and the number of antenna ports configured at the communication device being N.

In the current embodiment, the processor 706 may determine a plurality of PTRS ports for the communication device based at least on the coherent information. The transmitting circuitry 704 may transmit configuration information to the communication device indicating the number of the PTRS ports assigned to the communication device being N.

In another embodiment, the coherent information indicates that the communication device uses a partial-coherent transmission, the number of coherent antenna groups configured at the communication device being M, and the number of antenna ports in each coherent antenna group.

In the current embodiment, the processor 706 may determine a plurality of PTRS ports for the communication device based at least on the coherent information. The transmitting circuitry 704 may transmit configuration information to the communication device indicating the PTRS ports.

According to a preferred embodiment, the configuration information indicates the number of the PTRS ports being M. Each PTRS port may be configured to be associated with a corresponding transmission layer of the transmission layers transmitted with SRS ports within a corresponding coherent antenna group. For example, a PTRS port i is associated with a transmission layer $[x_i]$ of transmission layers transmitted with SRS ports within $i^{th}$ coherent antenna group.

In the current embodiment, the transmitting circuitry 704 may further transmit downlink control information (DCI) including a parameter indicating the value of $[x_i]$. The parameter has a bitwidth of $\Sigma_{i=1}^{min\{v,M\}}\lceil \log_2(S_i) \rceil$ comprising $min\{v, M\}$ parts, wherein v denotes the number of transmission layers, and $S_i$ denotes the number of antenna ports in $i^{th}$ coherent antenna group. The value of $[x_i]$ is indicated in the $i^{th}$ part of the parameter.

In the above embodiments, the apparatus 700 may be a base station that can communicate with UE(s).

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

The following is what is claimed:

1. A method performed by a user equipment (UE), the method comprising:
    transmitting coherent information of a communication device, wherein the coherent information indicates:
        that the communication device uses a non-coherent transmission, and a number of antenna ports configured at the communication device being N; or
        that the communication device uses a partial-coherent transmission, the number of coherent antenna groups configured at the communication device being M, and the number of antenna ports in each coherent antenna group; and
    receiving configuration information for the communication device, wherein the configuration information is based at least on the coherent information, indicates a plurality of phase tracking reference signal ports assigned to the communication device, and a number of the plurality of phase tracking reference signal ports being M.

2. The method of claim 1, further comprising:
    transmitting phase tracking reference signal with v phase tracking reference signal ports selected from an N phase tracking reference signal ports, wherein v denotes the number of transmission layers.

3. The method of claim 2, wherein each phase tracking reference signal port is associated with a transmission layer transmitted with a corresponded sounding reference signal port.

4. The method of claim 1, further comprising:
    transmitting phase tracking reference signal with k phase tracking reference signal ports, wherein k=min{v,M} and v denotes the number of transmission layers.

5. The method of claim 4, wherein a phase tracking reference signal port i is associated with a transmission layer [xi] of transmission layers, transmitted with sounding reference signal ports within ith coherent antenna group.

6. The method of claim 5, wherein the configuration information further includes downlink control information including a parameter indicating a value of [xi].

7. The method of claim 6, wherein the parameter has a bitwidth of $\Sigma_{i=1}^{min\{v,M\}}\lceil \log_2(S_1) \rceil$ comprised of min{v,M} parts, wherein $S_i$ denotes the number of antenna ports in ith coherent antenna group.

8. The method of claim 7, wherein the value of [xi] is indicated in an ith part of the parameter.

9. A method performed by a base station, the method comprising:
    receiving coherent information of a communication device, wherein the coherent information indicates:
        that the communication device uses a non-coherent transmission, and a number of antenna ports configured at the communication device being N; or
        that the communication device uses a partial-coherent transmission, the number of coherent antenna groups configured at the communication device being M, and the number of antenna ports in each coherent antenna group;
    determining a plurality of phase tracking reference signal ports for the communication device based at least on the coherent information; and
    transmitting configuration information to the communication device indicating the phase tracking reference signal ports assigned to the communication device, and a number of the plurality of phase tracking reference signal ports being M.

10. The method of claim 9, wherein each phase tracking reference signal port is associated with a layer transmitted with a corresponded sounding reference signal port.

11. The method of claim 9, wherein a phase tracking reference signal port i is associated with a transmission layer [xi] of transmission layers transmitted with sounding reference signal (SRS) ports within ith coherent antenna group.

12. The method of claim 11, wherein the configuration information further includes downlink control information including a parameter indicating a value of [xi].

13. The method of claim 12, wherein the parameter has a bitwidth of $\Sigma_{i=1}^{min\{v,M\}}\lceil \log_2(S_i) \rceil$ comprising min{v,M} parts, wherein v denotes the number of transmission layers, and $S_i$ denotes the number of antenna ports in ith coherent antenna group.

14. The method of claim 13, wherein the value of [xi] is indicated in an ith part of the parameter.

15. A user equipment (UE), comprising:
    at least one memory; and
    at least one processor coupled with the at least one memory and configured to cause the UE to:
        transmit coherent information of the UE, wherein the coherent information indicates that:
            the UE uses a non-coherent transmission, and a number of antenna ports configured at the UE being N; or the UE uses a partial-coherent transmission, the number of coherent antenna groups configured at the UE being M, and the number of antenna ports in each coherent antenna group; and receive configuration information for the UE, wherein the configuration information is based at least on the coherent information, indicates a plurality of phase tracking reference signal ports assigned to the UE, and a number of the plurality of phase tracking reference signal ports being M.

16. The UE of claim 15, wherein the at least one processor is configured to cause the UE to:

transmit a phase tracking reference signal with v phase tracking reference signal ports selected from N phase tracking reference signal ports, wherein v denotes the number of transmission layers.

17. The UE of claim 16, wherein the at least one processor is configured to cause the UE to associate each phase tracking reference signal port with a transmission layer transmitted with a corresponded sounding reference signal port.

18. A base station, comprising:
at least one memory; and
at least one processor coupled with the at least one memory and configured to cause the base station to:
   receive coherent information of a communication device, wherein the coherent information indicates:
     that the communication device uses a non-coherent transmission, and a number of antenna ports configured at the communication device being N; or
     that the communication device uses a partial-coherent transmission, the number of coherent antenna groups configured at the communication device being M, and the number of antenna ports in each coherent antenna group;
   determine a plurality of phase tracking reference signal ports for the communication device based at least on the coherent information; and
   transmit configuration information to the communication device indicating the phase tracking reference signal ports assigned to the communication device, and a number of the plurality of phase tracking reference signal ports being M.

* * * * *